United States Patent
Raber

(10) Patent No.: US 8,746,428 B2
(45) Date of Patent: Jun. 10, 2014

(54) CLUTCH DEVICE

(71) Applicant: Schaeffler Technologies AG & Co. KG, Herzogenaurach (DE)

(72) Inventor: Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/896,008

(22) Filed: May 16, 2013

(65) Prior Publication Data

US 2013/0256085 A1    Oct. 3, 2013

Related U.S. Application Data

(63) Continuation of application No. PCT/DE2011/001937, filed on Nov. 7, 2011.

(30) Foreign Application Priority Data

Nov. 19, 2010 (DE) .......................... 10 2010 052 021
Aug. 24, 2011 (DE) .......................... 10 2011 081 475
Aug. 24, 2011 (DE) .......................... 10 2011 081 476

(51) Int. Cl.
    *F16D 13/75* (2006.01)
(52) U.S. Cl.
    USPC .................................. 192/70.252; 192/111.3
(58) Field of Classification Search
    USPC ................... 192/111.18, 111.2, 111.3, 111.5, 192/111.17
    See application file for complete search history.

(56) References Cited

U.S. PATENT DOCUMENTS

| 3,752,286 | A | * | 8/1973 | Sink .......................... 192/70.252 |
| 4,228,883 | A |   | 10/1980 | Palmer |
| 4,718,522 | A | * | 1/1988 | Frania et al. ................ 188/79.55 |
| 5,251,737 | A | * | 10/1993 | Flotow et al. ............ 192/111.17 |
| 6,062,365 | A | * | 5/2000 | Gochenour .............. 192/70.252 |
| 6,296,098 | B1 | * | 10/2001 | Graton et al. ............ 192/70.252 |
| 6,354,419 | B1 | * | 3/2002 | Dalbiez et al. ........... 192/70.252 |

FOREIGN PATENT DOCUMENTS

| DE | 102005058844 | 7/2006 |
| DE | 102008051100 | 5/2009 |
| EP | 0769632 | 4/1997 |

* cited by examiner

*Primary Examiner* — David D Le
*Assistant Examiner* — Mark Manley
(74) *Attorney, Agent, or Firm* — Simpson & Simpson, PLLC

(57) ABSTRACT

A clutch device including at least one torque transmission device engageable and/or disengageable in an axial direction by a lever element and forming a friction-locking connection when engaged, at least one wear readjustment device that includes at least one rotatable ramp ring at least temporarily clampable by the lever element and at least one spindle drive rotatably supported to act on the ramp ring and including a spindle shaft, where the wear readjustment device includes at least one infinitely variable freewheel unit to rotate the spindle shaft in the case of a sensed wear condition of the torque transmission device, the infinitely variable freewheel unit including at least one wrap spring or at least one freewheel sleeve.

12 Claims, 5 Drawing Sheets

CLUTCH DEVICE

CROSS-REFERENCE TO RELATED APPLICATIONS

This application is filed under 35 U.S.C. §120 and §365(c) as a continuation of International Patent Application No. PCT/DE2011/001937, filed Nov. 7, 2011, which application claims priority from German Patent Application Nos. DE 102010052021.7, filed Nov. 19, 2010; DE 102011081475.2, filed Aug. 24, 2011; and DE 102011081476.0, filed Aug. 24, 2011, which applications are incorporated herein by reference in their entirety.

FIELD OF THE INVENTION

The present invention relates generally to clutch devices and, more particularly, to a clutch device that permits correction of a changing operating point in a simple way and with maximum accuracy.

BACKGROUND OF THE INVENTION

German Patent Specification DE 10 2008 051 100 A1 discloses a clutch device. In this friction clutch, an operating point that changes due to wear on the friction linings is automatically readjusted. A spindle drive is provided on the pressure plate to rotate the ramp ring in one direction in the case of wear. For this purpose, a pawl is fixedly arranged on the housing. When a predetermined amount of wear is exceeded, the pawl rotates a pinion of the spindle drive before the friction clutch is disengaged by creating a form-locking connection between the pinion and the pawl. As the friction clutch is being disengaged, the operating point is corrected by a rotation of the pinion caused by the pawl. This method only provides discontinuous step-by-step compensation of the friction lining wear.

Non-published German Patent Application No. 10 2010 052 021.7 furthermore discloses a friction clutch with a readjustment device where the sensing and actuating device consisting of a pawl and a pinion is replaced by a wrap rope connected to the housing and wrapped around the spindle of the spindle drive. The wrap rope rotates the spindle of the spindle drive as a function of the wear on the lining to correct the operating point, which has changed due to lining wear, in a continuous and infinitely variable way. An operating point that changes in both directions, for example in one direction due to lining wear and in the other direction due to swelling friction linings and/or potting of the pressure plate and/or counter pressure plate, cannot be completely corrected.

BRIEF SUMMARY OF THE INVENTION

An object of the present invention is to provide a clutch device that permits to correct a changing operating point in a simple way and with maximum accuracy.

In accordance with the invention, this object is attained by a clutch device which comprises at least one torque transmission device engageable and/or disengageable in an axial direction by a lever element and having a frictional engagement when engaged, and at least one wear readjustment device that includes at least one rotatable ramp ring at least temporarily clampable by the lever element and at least one spindle drive supported for rotation to act on the ramp ring and including a spindle shaft. The clutch device is characterized by the fact that the wear readjustment device includes at least one infinitely variable freewheel unit to rotate the spindle shaft in the case of a sensed wear condition of the torque transmission device, the infinitely variable freewheel unit including at least one wrap spring or at least one freewheel sleeve.

The clutch device, for example, includes a housing in which the torque transmission device is arranged. The torque transmission device preferably includes at least one counter pressure plate fixed to the housing, at least one pressure plate arranged to be fixed against rotation relative to the housing and displaceable to a limited extent relative to the counter pressure plate in an axial direction of the clutch device, and at least one clutch disc having at least one friction lining clampable in frictional engagement between the pressure plate and the counter pressure plate to transmit a torque. The infinitely variable freewheel unit is preferably designed to transmit a direction-of-rotation-dependent torque in a force-locking, preferably frictionally engaged way to the spindle shaft.

Preferably a sensing device is provided to sense a condition of wear of the torque transmission device during an engagement of the torque transmission device as a function of a distance to a clutch device component fixed to the housing, preferably a counter pressure plate of the torque transmission device. The infinitely variable freewheel unit is drivable for wear readjustment purposes by the sensing device by rotating the spindle shaft upon a disengagement of the torque transmission device.

In particular, the aforementioned object is advantageously attained by a clutch device that includes a counter pressure plate fixed against rotation relative to a housing and a pressure plate received to be fixed against rotation and axially displaceable relative to the counter pressure plate by means of leaf springs and pre-tensioned to a pre-set operating point by a lever element while clamping friction linings, as well as a wear readjustment device for readjusting a changing operating point by means of a ramp ring received by means of ramps distributed in the circumferential direction and along the circumference on complementary counter-ramps of the pressure plate between pressure plate and lever element, the ramp ring being driven to rotate as a function of a change of the operating point by a spindle drive received on the pressure plate and formed by a spindle shaft and a spindle nut received thereon and axially displaceable upon a rotation of the spindle shaft, as well as a sensing device detecting a change of the operating point and controlling the spindle drive as a function of a distance to a component fixed to the housing, where at least one infinitely variable freewheel unit for readjusting the operating point is provided on the spindle shaft, the freewheel unit establishing a friction-locking connection with the spindle shaft as a function of the position of the operating point. The lever element is preferably a diaphragm spring; however, it may also be a lever spring.

In accordance with an advantageous further feature, the wrap spring of the infinitely variable freewheel unit wraps around the spindle shaft under inherent pre-tension and is designed to establish a force-locking, preferably frictionally engaged connection with the spindle shaft for the purpose of wear readjustment by a rotation of the ramp ring relative to complementary counter-ramps as a function of a wear-induced change of the position of an operating point of the torque transmission device. In particular, the wrap spring is preferably designed as one piece.

The infinitely variable freewheel unit preferably includes a wrap spring that is actable upon on the spindle shaft at its spring ends, enters into a frictional engagement with the spindle shaft as a function of the position of the operating point, and is readjusted in terms of its pre-tensioning relative to the spindle shaft in accordance with the rotation of the ramp ring. The spring ends of the wrap spring are preferably actable upon on the pressure plate side and on the side of the sensing device if the spindle drive is supported on the pressure plate side. If the spindle drive is supported on the clutch cover side, the spring ends of the wrap spring are preferably actable upon on the clutch cover side and on the sensing device side.

In both cases the wrap spring is used as a controllable freewheel that transmits torque in a direction of rotation of the spindle shaft after actuation by the sensing device. For this purpose, the wrap spring is connected to the spindle shaft in a switchable and frictionally engaged way as a result of belt friction in accordance with the capstan equation/Eytelwein's formula by acting upon the spring ends of the wrap springs in a corresponding way. One spring end is axially supported on the pressure plate side, i.e. on a component that is axially displaced during an actuating process, for example on the pressure plate, ramp ring, lever element and/or diaphragm spring, or on a component connected thereto. The other spring end of the wrap spring is supported on the sensing device, i.e. directly on the sensing device or on a component connected thereto. The same applies to the actuating lever of a freewheel sleeve.

In accordance with a further advantageous feature, the freewheel sleeve of the infinitely variable freewheel unit is arranged on the spindle shaft and is designed to enter into a force-locking, preferably frictionally engaged connection with the spindle shaft for the purpose of wear readjustment by a rotation of the ramp ring relative to complementary counter-ramps as a function of the position of a wear-induced change of an operating point of the torque transmission device.

The sensing device preferably includes a finger that is preferably arranged on a pressure plate of the torque transmission device and acts on a spring end of the wrap spring or on an actuating lever of the freewheel sleeve against the action of an energy storage element preferably embodied as a helical spring or leaf spring.

The sensing device comprises a finger or pin for detecting deviations of the operating point by registering the position of the pressure plate relative to the counter pressure plate or to components in fixed axially association with the counter pressure plate, for example the housing, when the torque transmission device is engaged. The finger or pin may be arranged on the pressure plate side and may sense the deviation of the operating point relative to the counter pressure plate or it may be arranged on the counter pressure plate or housing and may sense the deviation of the operating point relative to the pressure plate. As a rotation of the ramp ring located between the pressure plate and the diaphragm spring is impossible due to the contacting pressure applied to the pressure plate by the diaphragm spring when the torque transmission device is engaged, the angle of rotation required to correct a shifted operating point is buffered in the form of a pre-tensioned condition of the sensing device and is at least partly converted into an angle of rotation of the ramp ring under reduction of the pre-tension during the subsequent disengagement process in which the ramp ring is released. An operating point that has previously not been corrected in a final way may be continuously corrected in subsequent engagement and disengagement operations of the clutch device.

In accordance with an advantageous exemplary embodiment the sensing device may be formed by a finger that is arranged on the pressure plate to be displaceable against the action of an energy storage element and acts upon a spring end of the wrap spring. In this case, the wrap spring remains under pre-tension on the spindle shaft during an actuation of the clutch device in the case of a correct operating point due to the fact that one end is supported on the pressure plate side while the other end is pre-tensioned by the energy storage element. Thus no rotation occurs, not even accidental rotation of the ramp ring due to a blocking of the spindle shaft by the wrap spring, even if the torque transmission device is disengaged and the ramp ring is released. When, during an engagement process of the torque transmission device, the finger impinges on a stop fixed to the housing, for example on the counter pressure plate, as a result of a shifting operating point, the wrap spring is released relative to the spindle shaft and rotates relative to the spindle shaft through a pre-determined amount. In the subsequent disengagement process of the torque transmission device, the friction-locking connection is reestablished due to the action on the wrap spring and entrains the drive shaft, rotating the spindle shaft and thus the ramp ring. The energy storage element that pre-tensions the finger in the direction of the counter pressure plate may be a helical spring, for example.

In accordance with an alternative exemplary embodiment, the sensing device may be formed by a leaf spring elastically received on the housing and acting on a spring end of the wrap spring. The wrap spring is pre-tensioned against a stop on the pressure plate side, forming a frictional engagement with the spindle shaft. When the pressure plate is displaced in the direction of the counter pressure plate as the operating point shifts, the pre-tensioning of the wrap spring by the leaf spring, which is preferably arranged on the housing, is removed and the wrap spring is rotated relative to the spindle shaft. In the subsequent disengagement process, the spindle shaft and the wrap spring rotate together under the action of the leaf spring to readjust the ramp ring.

The wear readjustment device preferably includes a readjustment unit for readjusting the pre-tension and/or the angular position of the infinitely variable freewheel unit arranged on the spindle shaft.

In accordance with a particularly advantageous feature, the readjustment unit may be wedge-shaped and displaceable in the transverse direction of the clutch device or in the circumferential direction of the clutch device.

In particular, the readjustment unit may advantageously be fixed to the ramp ring or to a spindle nut of the spindle drive or be integral with the ramp ring or of the spindle nut.

Advantageously, a spring end of the wrap spring or an actuating lever of the freewheel sleeve may be slideably engaged with a support surface of the readjustment unit.

In accordance with a further exemplary embodiment, the wrap spring end or the freewheel sleeve actuating lever that is slideably engaged with the support surface of the readjustment unit preferably and the wrap spring end or actuating lever that is actable upon by the finger are preferably the same. With wrap springs in particular, it is not necessary for the second spring end remote from the finger to be supported on a component. However, for the purpose of readjusting the pre-tensioning of the wrap spring and/or the angular position of the wrap spring, this second spring end remote from the finger may be supported on a readjustment unit, preferably on the ramp ring or a component fixed against rotation relative thereto.

To compensate for a continuous rotation of the wrap spring during the succession of readjusting processes occurring during the useful life of the clutch device, corresponding stops of at least one spring end of the wrap spring are readjusted. For example, the readjustment of the pre-tensioning of the wrap spring arranged on the spindle shaft may be achieved by means of a component, for example made of sheet metal, that forms a support surface for a spring end of the wrap spring and rises progressively in the direction of rotation of the ramp ring. Thus the path of the spring end that is acted upon on the sensing device side is limited by the support surface. Alternatively, the spring end of the wrap spring on the pressure plate side may rest against the support surface.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
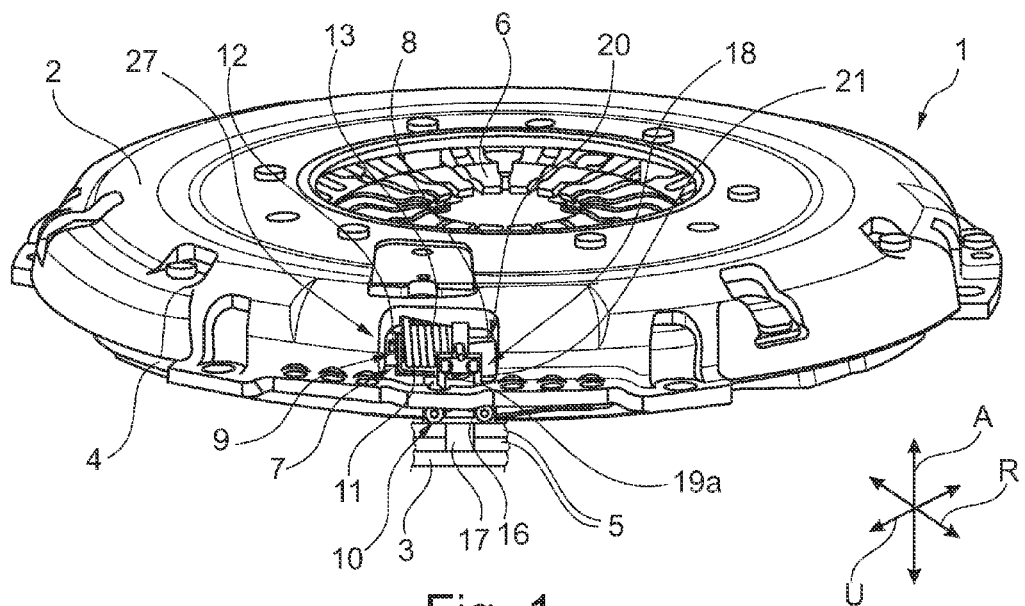
FIG. 1 illustrates an exemplary embodiment of a clutch device including an infinitely variable wear readjustment device.
Figure 2:
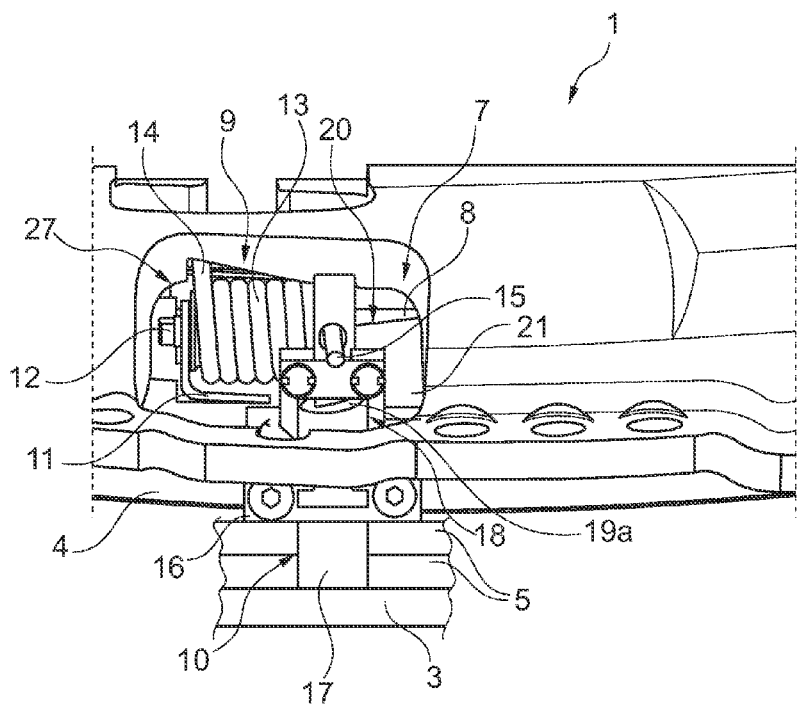
FIG. 2 illustrates a detail of the wear readjustment device of the clutch device showing FIG. 1.
Figure 3:
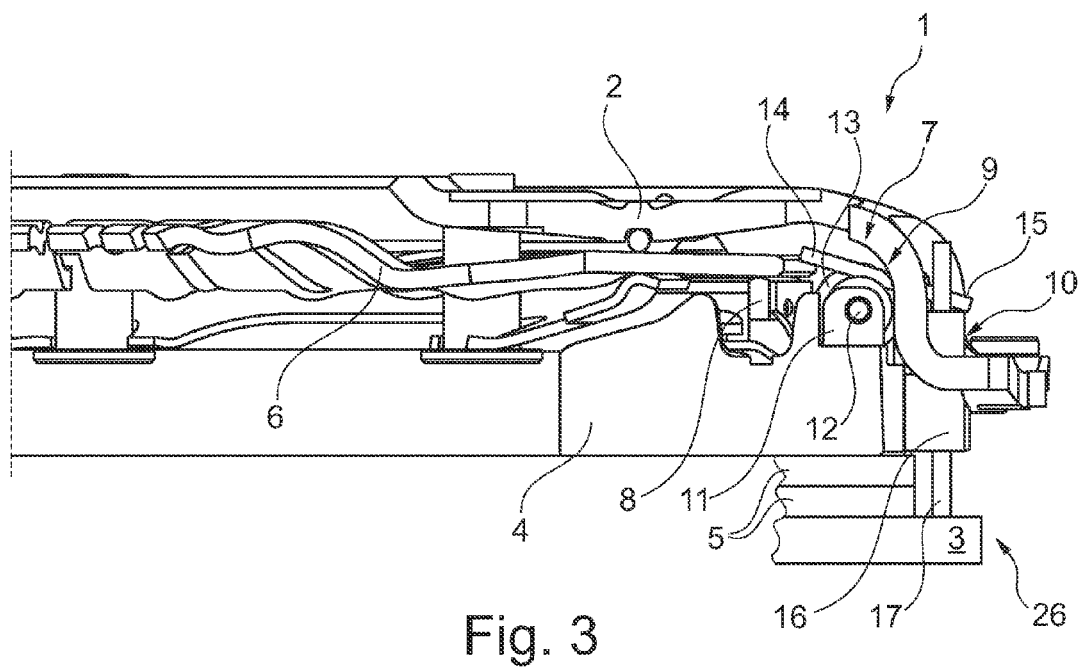
FIG. 3 is a sectional view of the clutch device shown in FIG. 1.
Figure 4:
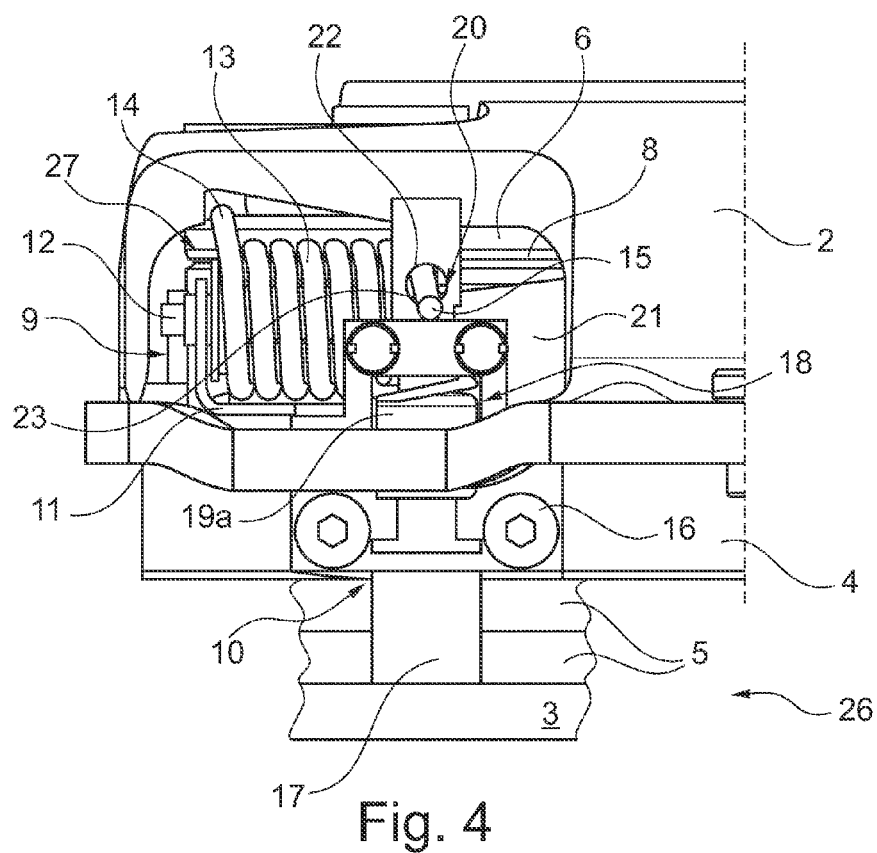
FIG. 4 illustrates a detail of FIG. 3.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Identical elements are provided with the same reference numerals in the figures and are described only once.

FIGS. 1 to 4 are different representations of a first exemplary embodiment of a clutch device. Clutch device 1 includes counter pressure plate 3 (only partly shown) connected to housing 2. Clutch device 1 further includes pressure plate 4 fixed against rotation relative to housing 2 and movable in axial direction A by means of non-illustrated leaf springs and lever element 6 supported on housing 2 and urging pressure plate 4 in axial direction A against counter pressure plate 3, clamping friction linings 5 in the process. Lever element 6 is preferably embodied as a diaphragm spring.

Counter pressure plate 3 that is fixed to the housing, pressure plate 4 that is fixed against rotation relative to the housing and movable to a limited extend relative to counter pressure plate 3 in axial direction A of clutch device 1, and the clutch disc, which includes at least one friction lining 5 clampable in a friction-locking way between pressure plate 4 and counter pressure plate 3 to transmit a torque, preferably from torque transmission device 26 of clutch device 1.

To disengage clutch 1 or torque transmission device 26, on the inside in radial direction R, a release system acts on lever element 6, i.e., the diaphragm spring, in an axial direction towards counter pressure plate 3. Assisted by the pre-tensioned leaf springs, pressure plate 4 is caused to disengage from friction linings 5 of the otherwise non-illustrated clutch disc.

If the thickness of friction linings 5 is reduced as a result of friction lining wear, with the clutch engaged, a virtual clutch operating point on the friction surface of pressure plate 4 relative to friction linings 5 shifts towards counter pressure plate 3. As a result, lever element 6 lifts up radially on the inside and the pressure behavior and the disengagement paths change. To regain the original condition in the case of friction lining wear, clutch device 1 includes an infinitely self-adjusting wear readjustment device 7 formed by ramp ring 8, spindle drive 9 driving ramp ring 8 in the case of a readjustment, and sensing device 10. Ramp ring 8 is arranged between lever element 6 and pressure plate 4 and has ramps that are distributed across the circumference, rise in circumferential direction U, and rest against complementary counter-ramps on pressure plate 4.

Mount 11, on which spindle shaft 12 is received for rotation, fixedly connects spindle drive 9 to pressure plate 4. Spindle nut 25 (only shown in FIG. 9) that shifts when spindle shaft 12 is rotated is arranged on spindle shaft 12 to engage with ramp ring 8 in a form-locking way and to rotate ramp ring 8 through a defined angle of rotation in accordance with the selected, preferably self-locking translation of the spindle drive when spindle shaft 12 is rotated.

Infinitely variable freewheel unit 27 is provided on spindle shaft 12 to drive spindle shaft 12. Infinitely variable freewheel unit 27 preferably includes wrap spring 13 or is embodied as wrap spring 13. In a non-illustrated exemplary embodiment, infinitely variable freewheel unit 27 includes a freewheel sleeve or is embodied as a freewheel sleeve.

Wrap spring 13, whose inner diameter is smaller than the outer diameter of spindle shaft 12, is received under tension on the outer diameter of spindle shaft 12. Depending on the actuation of spring ends 14, 15 thereof, in the form of a freewheel, wrap spring 13 releases spindle shaft 12 in one direction of rotation and blocks it in the other direction.

In the first exemplary embodiment, sensing device 10 includes mount 16 fixedly received on pressure plate 4 and finger 17 received on mount 16 so as to be movable in axial direction A to a limited extent towards counter pressure plate 3 through the action of energy storage element 18, in the present example helical spring 19a.

Wrap spring end 14 on the side of the lever element may contact lever element 6 on the pressure plate side. However, wrap spring end 14 may likewise terminate freely on spindle shaft 12, i.e., without direct support on the pressure plate side. The other wrap spring end 15 on the side of the finger is acted upon by sensing device 10 as a function of the friction lining wear of friction linings 5 and thus as a function of the operating point. The same applies in the case of a freewheel sleeve to a finger-side actuating lever of the freewheel sleeve and, if applicable, to a (further) actuating lever on the lever element side.

Wear readjustment device 7 preferably includes readjustment unit 21 to readjust the pre-tensioning and/or the angular position of infinitely variable freewheel unit 27, in particular of wrap spring 13 arranged on the spindle shaft. Readjustment unit 21 is wedge-shaped and displaceable in the transverse direction of clutch device 1. Advantageously, readjustment unit 21 may be fixed to spindle nut 25 of spindle drive 9 or may be integral with spindle nut 25.

In the illustrated exemplary embodiment, to prevent excess wear readjustment, i.e., to ensure correct readjustment, finger-side spring end 15 of wrap spring 13 is slideably engaged with support surface 20 of readjustment unit 21. The same applies to a finger-side actuating lever of a non-illustrated freewheel sleeve.

The arrangement of wear readjustment device 7 in clutch device 1 results in the following functionality. With clutch device 1 and torque transmission device 26 engaged and the operating point unchanged, finger 17 at most touches counter pressure plate 3 but is not displaced or only displaced to such an extent that its engagement portion, for example a hole in finger 17, engaging in spring end 15 is not displaced by support surface 20 of readjustment unit 21. Due to the axial height of the hole in the finger in which spring end 15 is received, i.e., due to the clearance between stops 22, 23, the formation of the frictional engagement between wrap spring 13 and spindle shaft 12 may be controlled and adjusted.

When torque transmission device 26 is disengaged, pressure plate 4 is moved axially away from counter pressure plate 3 and finger 17 lifts off counter pressure plate 3. The frictional engagement between wrap spring 13 and spindle shaft 12 remains, preventing an undesired readjustment of the ramp ring 8 which may occur due to vibrations of pressure plate 4. Wrap spring 13 does not move and spring end 15 facing towards counter pressure plate 3 rests on support surface 20 of readjustment unit 21.

If the friction lining thickness of friction linings 5 is reduced due to wear, pressure plate 4 and thus the operating point of clutch device 1 shifts towards counter pressure plate 3 so that with torque transmission device 26 in the process of being engaged or in an engaged condition, finger 17 comes to rest on counter pressure plate 3 and is axially displaced against the action of helical spring 19a. As a consequence, spring end 15 of wrap spring 13 is lifted and the frictional engagement between wrap spring 13 and spindle shaft 12 is released as the coils of wrap spring 13 are widened and spring 13 opens. On the one hand, the opening of wrap spring 13 may occur as a result of ramp ring 8 being clamped by lever element 6, which results in a support via blocked spindle drive 9 connected to ramp ring 8 by spindle nut 25. On the other hand, spring end 14 may be directly supported on lever element 6, which may at least assist in the opening of wrap spring 13.

When the operating point has shifted to a sufficient extent, wrap spring 13 is at least partially rotated relative to spindle shaft 12. Ramp ring 8 is protected against undesired rotation by the contacting pressure exerted by lever element 6 when clutch device 1 is engaged.

When clutch device 1 is subsequently disengaged, the engagement between finger 17 and counter pressure plate 3 is released and finger 17 is shifted back by helical spring 19a so that the pre-tensioning effect on spring end 15 of wrap spring 13 is removed, allowing wrap spring 13 to reestablish the frictional engagement with spindle shaft 12. Furthermore once the frictional engagement is established, wrap spring 13 rotates spindle shaft 12 and thus ramp ring 8, which is released when clutch device 1 is in the disengaged condition, until the path of spring end 15 is limited by support surface 20.

Support surface 20 is provided by readjustment device 21, which is fixedly connected to spindle nut 25 in the illustrated exemplary embodiment or is integral therewith. The increasing height of support surface 20 in the direction of rotation of ramp ring 8 allows wrap spring 13 to rotate to an increasing extent as the number of readjustments increases, and allows finger 17 to shift to an increasing extent due to the fact that counter pressure plate 3 moves closer to pressure plate 4 as the wear increases over the useful life of the device. Thus, finger 17 senses the same shifting distance of the operating point over the entire useful life.

Figure 5:
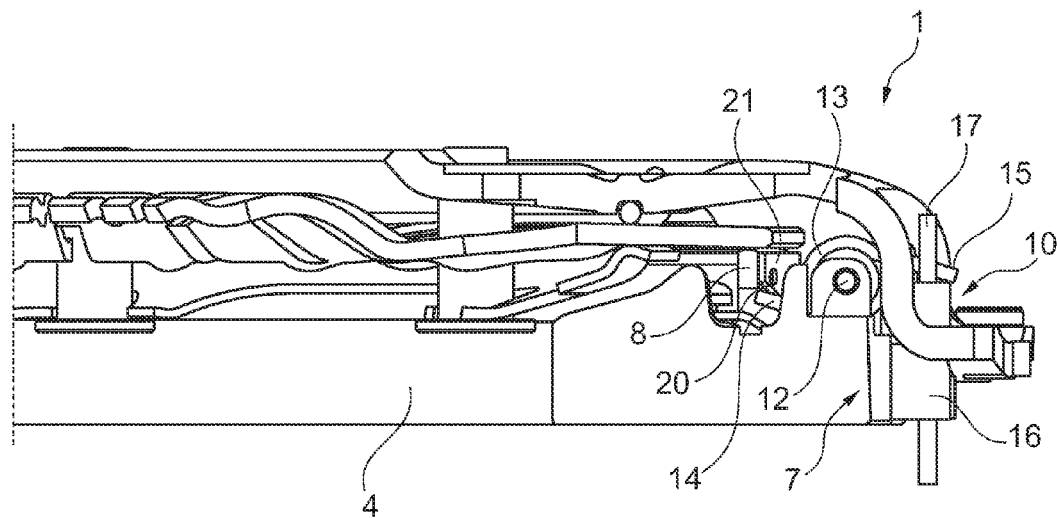
FIG. 5 is a sectional view of a second exemplary embodiment of a clutch device including a modified wear readjustment device.
Figure 6:
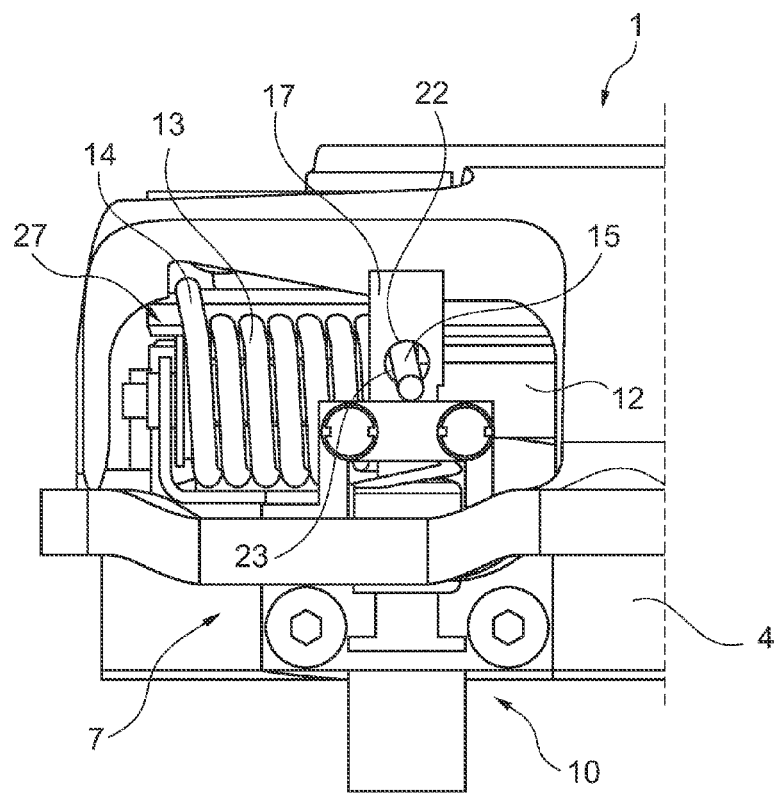
FIG. 6 illustrates a detail of FIG. 5.

In contrast to the exemplary embodiment shown in FIGS. 1 to 4, the second exemplary embodiment of clutch device 1, which is shown in FIGS. 5 and 6, includes modified wear readjustment device 7 with modified spring ends 14, 15 of wrap spring 13 and modified readjustment unit 21 for readjusting the position of rotation of wrap spring 13. In particular, readjustment unit 21 is fixed to ramp ring 8 or is integral with ramp ring 8. Thus, readjustment unit 21 is displaceable in circumferential direction U of clutch device 1, preferably rotationally fixed relative to ramp ring 8.

For this purpose, ends 14, 15 of wrap spring 13 are preferably offset relative to each other in terms of the axis of rotation of wrap spring 13 and of spindle shaft 12. Thus, pressure-plate-side spring end 14, which is located further inward in radial direction R in the illustrated example, may be supported by ramp-ring-side support surface 20 of readjustment unit 21 in a slideably movable way to readjust the pre-tensioning and/or the angular position of wrap spring 13.

The functionality of sensing device 10 in interaction with spring end 15 essentially corresponds to the functionality of wear readjustment device 7 of FIGS. 1 to 4.

Figure 7:
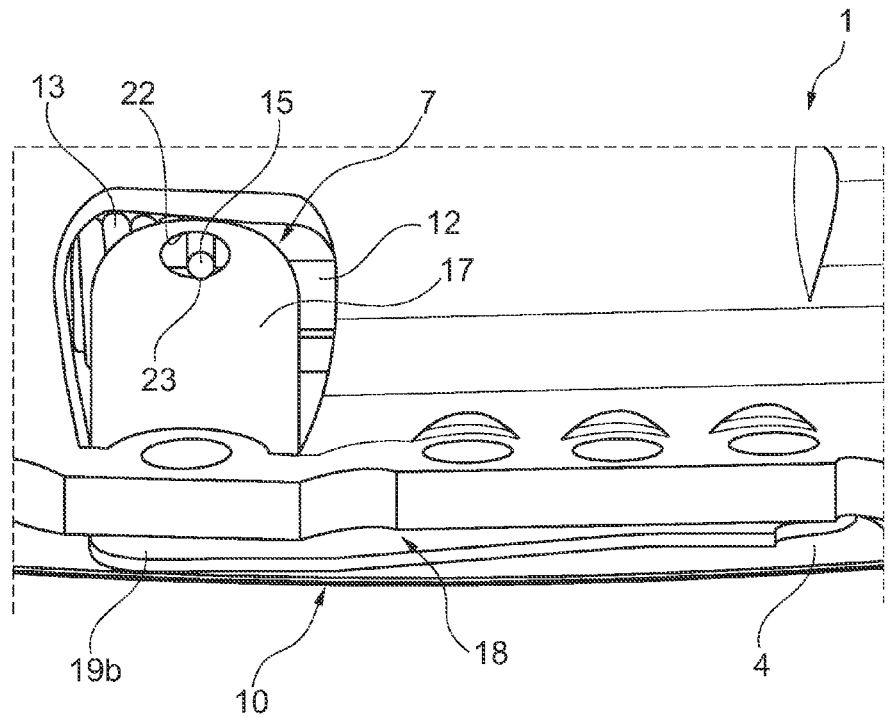
FIG. 7 illustrates a detail of a third exemplary embodiment of a clutch device including a modified wear readjustment device.
Figure 8:
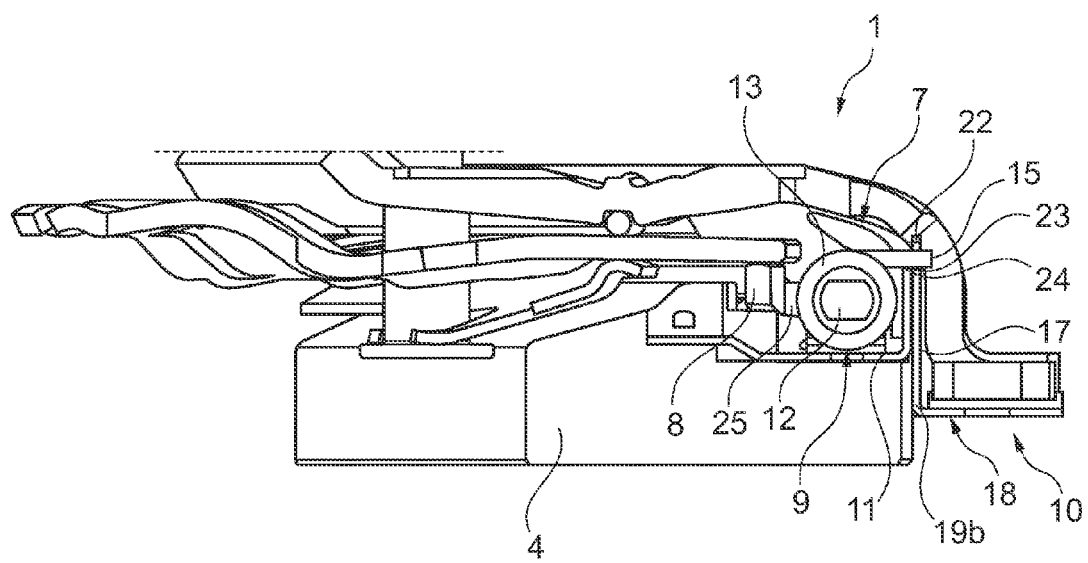
FIG. 8 is a sectional view of the clutch device shown in FIG. 7.
Figure 9:
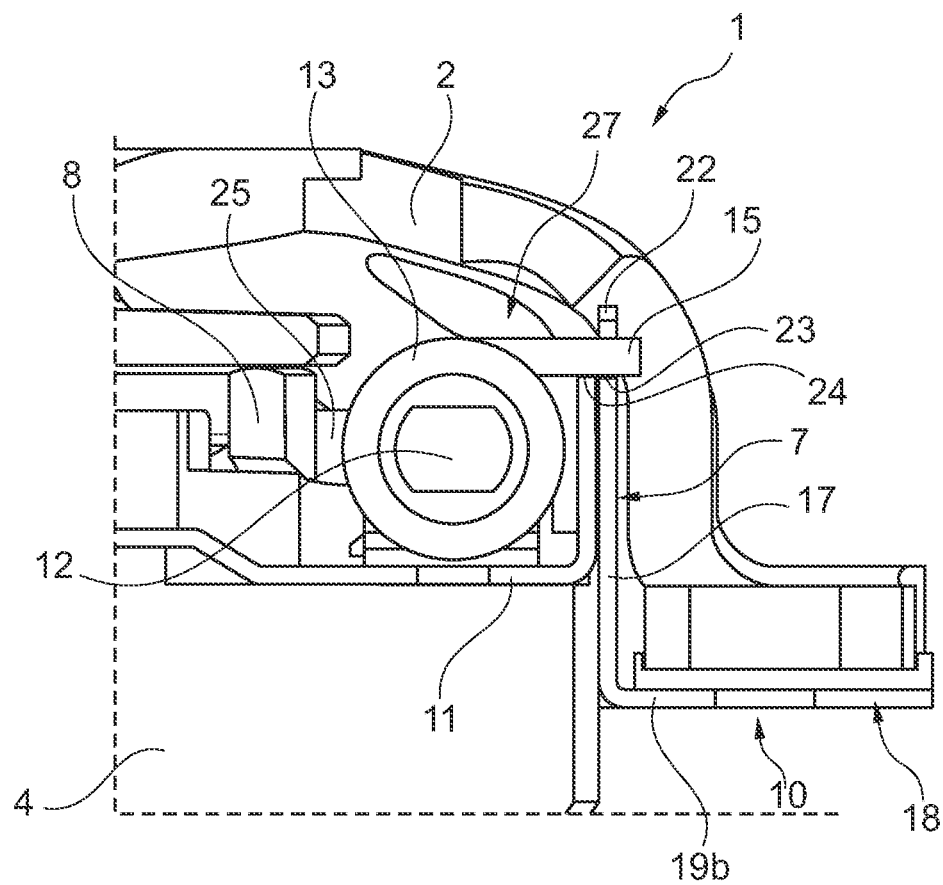
FIG. 9 illustrates a detail of FIG. 8.

FIGS. 7 to 9 illustrate a third exemplary embodiment of clutch device 1 including modified wear readjustment device 7. In contrast to the wear readjustment devices of the previous figures, sensing device 10 of the third exemplary embodiment is formed as leaf spring 19b arranged on housing 2 to be elastically deformable relative thereto. Leaf spring 19b has finger 17, which is preferably integral with leaf spring 19b and acts on spring end 15 of wrap spring 13, thus controlling the wrap effect of wrap spring 13. In the process, finger-side spring end 15 is supported by stop 24 formed by mount 11.

As a result, a path of wear of pressure plate 4 relative to housing 2 that is fixedly connected to the non-illustrated counter pressure plate is sensed as follows. During a movement to disengage torque transmission device 26, which is illustrated in the engaged condition in the drawing, pressure plate 4 shifts in the axial direction towards housing 2 between stops 22, 23 of finger 17. Due to the frictional engagement between wrap spring 13 and spindle shaft 12, an undesired rotation thereof in the disengaged condition is prevented.

With pressure plate 4 and its operating point shifting away from housing 2 in the process of engaging or in the engaged condition of torque transmission device 26 due to friction lining wear spring end 15 is displaced by stop 23. The result is that the wrap effect of wrap spring 13 on spindle shaft 12 is released and wrap spring 13 is rotated relative to the spindle shaft.

In the subsequent disengagement process of torque transmission device 26, pressure plate 4 shifts in the direction of housing 2. In the process, spring end 15 of wrap spring 13 is released by stop 23 and the frictional engagement with spindle shaft 12 is reestablished. Subsequently, stop 22 acts on spring end 15 and rotates wrap spring 13 and spindle shaft 12, causing spindle nut 25 engaged with ramp ring 8 to move on spindle shaft 12 and to rotate ramp ring 8.

It is to be understood that readjustment device 7 of FIGS. 1 to 9 may be designed initially to readjust by an amount that is smaller than the wear distance between the shifted operating point and the correct operating point and successively to readjust to the correct operating point in subsequent readjustment cycles. It is also to be understood that like in the first exemplary embodiment, in the second and third exemplary embodiments, wrap spring 13 may likewise be replaced by a freewheel sleeve as infinitely variable freewheel unit 27.

In summary, the aforementioned exemplary embodiments relate to clutch device 1 having at least one torque transmission device 26 that is engageable and/or disengageable in axial direction A by lever element 6 and forms a friction-locking connection when engaged, and at least one wear readjustment device 7 that includes at least one rotatable ramp ring 8 at least temporarily clampable by lever element 6, and at least one spindle drive 9 rotatably supported to act on ramp ring 8 and including spindle shaft 12. Wear readjustment device 7 includes at least one infinitely variable freewheel unit 27 to rotate spindle shaft 12 in the case of a sensed wear condition of torque transmission device 26. Infinitely variable freewheel unit 27 preferably includes at least one wrap spring 13 or at least one freewheel sleeve.

LIST OF REFERENCE SYMBOLS 1 clutch device
2 housing
3 counter pressure plate
4 pressure plate
5 friction lining
6 lever element
7 wear readjustment device
8 ramp ring
9 spindle drive
10 sensing device
11 mount
12 spindle shaft
13 wrap spring
14 spring end
15 spring end
16 mount
17 finger
18 energy storage device
19a helical spring
19b leaf spring
20 support surface
21 readjustment unit
22 stop
23 stop
24 stop
25 spindle nut
26 torque transmission device
27 infinitely variable freewheel unit
A axial direction
R radial direction
U circumferential direction

What is claimed is:

1. A clutch device (1) comprising:
    at least one torque transmission device (26) engageable and/or disengageable in an axial direction A by a lever element (6), including a pressure plate (4) and a counter pressure plate (3), and forming a friction-locking connection when engaged;
    at least one wear readjustment device (7) that includes:
        at least one rotatable ramp ring (8) at least temporarily clampable by the lever element (6);
        at least one spindle drive (9) rotatably supported to act on the ramp ring (8) and including a spindle shaft (12);
        at least one wrap spring (13):
            wrapped about an exterior surface of the spindle shaft; frictionally engaged with the exterior surface when the transmission device is disengaged; and, including a first end; and,
        at least one infinitely variable freewheel unit (27) arranged, in the case of a sensed wear condition of the torque transmission device (26), to displace the first end of the at least one wrap spring to:
            disengage the at least one spring from the exterior surface;
            rotate the spindle shaft (12) within the at least one spring; and
            rotate the ramp ring to displace the pressure plate toward the counter pressure plate in axial direction A.

2. The clutch device (1) recited in claim 1, wherein a sensing device (10) is provided to sense a condition of wear of the torque transmission device (26) in the process of engaging the torque transmission device (26) as a function of a distance to the counter-pressure plate (3) of the torque transmission device (26 fixed to the housing and wherein the infinitely variable freewheel unit (27) is drivable for wear readjustment purposes by the sensing device (10) upon disengagement of the torque transmission device (26) by the rotation of the spindle shaft (12).

3. The clutch device (1) recited in claim 1, wherein the wrap spring (13) of the infinitely variable freewheel unit (27) is wrapped about the exterior surface of the spindle shaft (12) under inherent pre-tension and the frictional engagement with the spindle shaft (12) for the purpose of wear readjustment as a result of a rotation of the ramp ring (8) relative to complementary counter-ramps as a function of a wear-induced change of the position of an operating point of the torque transmission device (26).

4. The clutch device (1) recited in claim 1, wherein a sensing device (10) is provided, the sensing device (10) including a finger (17) arranged on the pressure plate (4) of the torque transmission device (26) and acting on a spring end (15) of the wrap spring (13 against the action of an energy storage element (18) embodied as a helical spring (19a) or leaf spring (19b).

5. The clutch device (1) recited in claim 1, wherein the wear readjustment device (7) includes a readjustment unit (21) for readjusting the pre-tension or the angular position of the infinitely variable freewheel unit (27) arranged on the spindle shaft (12).

6. The clutch device (1) recited in claim 5, wherein the readjustment unit (21) is wedge-shaped and displaceable in the transverse direction of the clutch device (1) or in the circumferential direction (U) of the clutch device (1).

7. The clutch device (1) recited in claim 5, wherein the readjustment unit (21) is fixed to the ramp ring (8) or to a spindle nut (25) of the spindle drive (9) or is integral with the ramp ring (8) or spindle nut (25).

8. The clutch device recited in claim 1, wherein a spring end (14, 15) of the wrap spring (13) is slideably engaged with a support surface (20) of the readjustment unit (21).

9. The clutch device (1) recited in claim 8, wherein that spring end (15) of the wrap spring (13) that is slideably engaged with the support surface (20) of the readjustment unit (21) is the same spring end (15) or the same actuating lever that is actable upon by the finger (17).

10. The clutch device (1) recited in claim 1, wherein the wear readjustment device (7) includes a readjustment unit (21) for readjusting the pre-tension and the angular position of the infinitely variable freewheel unit (27) arranged on the spindle shaft (12).

11. A clutch device, comprising:
a housing;
a counter pressure plate;
a pressure plate;
a friction lining;
a lever element arranged to displace the pressure plate in an axial direction to clamp the pressure plate, the friction lining, and the counter pressure plate;
a spindle shaft mounted on a mount fixedly connected to the pressure plate;
a wrap spring:
wrapped about an exterior surface of the spindle shaft;
frictionally engaged with an exterior surface of the spindle shaft when the pressure plate, the friction lining, and the counter pressure plate are not clamped; and,
including a first end;
a ramp ring; and,
a sensing device including a mount fixed with respect to the pressure plate and engaged with the first end of the wrap spring, wherein in response to wear of the pressure plate or counter pressure plate:
the pressure plate is arranged to displace a first distance in the axial direction when the pressure plate, friction lining, and counter pressure plate are clamped;
the spindle shaft is arranged to displace the first distance in the axial direction to urge the first end of the wrap spring against the mount to frictionally disengage the wrap spring from the exterior surface;
the spindle shaft is arranged to rotate to adjust a position of the pressure plate in the axial direction when the pressure plate, the friction lining, and the counter pressure plate are not clamped.

12. A clutch device, comprising:
a housing;
a counter pressure plate;
a pressure plate;
a friction lining;
a lever element arranged to displace the pressure plate in an axial direction to clamp the pressure plate, the friction lining, and the counter pressure plate;
a spindle shaft mounted on a mount fixedly connected to the pressure plate;
a wrap spring:
wrapped about an exterior surface of the spindle shaft;
frictionally engaged with an exterior surface of the spindle shaft when the pressure plate, the friction lining, and the counter pressure plate are not clamped; and,
including a first end; and,
a second end;
a ramp ring free of contact with the wrap spring; and,
a sensing device including a mount fixed with respect to the pressure plate and engaged with the second end of the wrap spring, wherein:
when the pressure plate, the friction lining, and the counter pressure plate are not clamped, the wrap spring is frictionally engaged with the exterior surface; and,
in response to wear of the pressure plate or counter pressure plate, the pressure plate is arranged to displace a first distance in the axial direction when the pressure plate, friction lining, and counter pressure plate are clamped to:
frictionally disengage the wrap spring from the exterior surface; and,
displace the spindle shaft with respect to the wrap spring to adjust a position of the pressure plate in the axial direction when the pressure plate, the friction lining, and the counter pressure plate are not clamped.

* * * * *